United States Patent
Amrhein et al.

(10) Patent No.: US 7,426,590 B2
(45) Date of Patent: Sep. 16, 2008

(54) PLUG-IN COMMUNICATION MODULE AND METHOD FOR COMMUNICATING USING A PLUG-IN COMMUNICATION MODULE

(75) Inventors: Armin Amrhein, Kümmersbruck (DE); Elmar Thurner, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 522 days.

(21) Appl. No.: 11/064,754

(22) Filed: Feb. 24, 2005

(65) Prior Publication Data

US 2005/0198339 A1   Sep. 8, 2005

(30) Foreign Application Priority Data

Feb. 25, 2004   (EP) .................................. 04004217

(51) Int. Cl.
*G06F 15/16* (2006.01)
*G06F 13/00* (2006.01)

(52) U.S. Cl. .................... 710/62; 710/2; 710/8; 710/9; 710/10; 710/63; 710/72; 710/73; 710/74; 709/218; 709/224; 709/250; 708/2; 708/18; 708/83

(58) Field of Classification Search .............. 710/2, 710/8–10, 62, 63, 72–74; 709/224, 250, 709/218; 708/2, 18, 83
See application file for complete search history.

(56) References Cited

U.S. PATENT DOCUMENTS

| | | | |
|---|---|---|---|
| 6,061,603 A * | 5/2000 | Papadopoulos et al. | ....... 700/83 |
| 6,370,603 B1 | 4/2002 | Silverman et al. | |
| 6,567,863 B1 | 5/2003 | Lafuite et al. | |
| 2002/0156926 A1 | 10/2002 | Batke et al. | |

FOREIGN PATENT DOCUMENTS

| | | |
|---|---|---|
| DE | 42 23 193 A1 | 1/1994 |
| DE | 196 13 027 A1 | 9/1997 |

* cited by examiner

*Primary Examiner*—Tammara R Peyton

(57) ABSTRACT

The invention relates to a plug-in communication module (1) and a method for communicating using a plug-in communication module (1) to simplify the communication interfacing of assemblies and devices. A communication module (1) is proposed with means (2) for storing and executing software components (3, 4, 5) with communication functionality, with first connection means (7) for direct electrical and mechanical coupling to interfaces (8) of at least a first assembly (9), with access means (6) for accessing local communication means (10) of the first assembly (9) and with second connection means (11) for electrical coupling to interfaces (12) of at least a second assembly (13). Advantageous embodiments relate in particular to a communication module, with which at least one of the software components (3, 4, 5) is provided to execute communication tasks using Internet technologies and/or at least one of the software components (3, 4, 5) is a Web server or is provided to execute Web services.

22 Claims, 2 Drawing Sheets

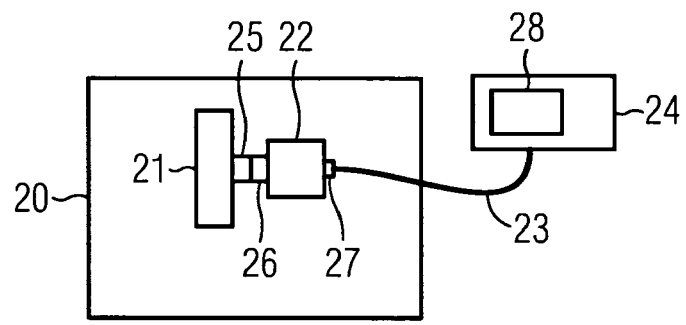
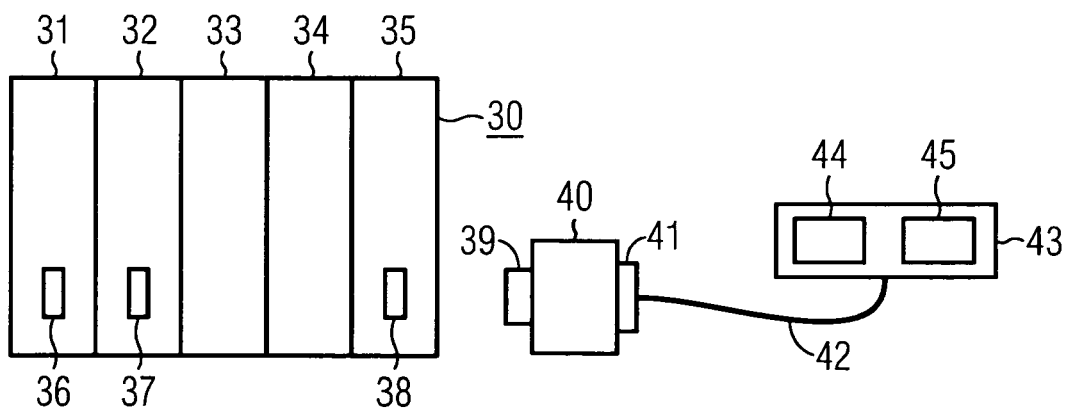

PLUG-IN COMMUNICATION MODULE AND METHOD FOR COMMUNICATING USING A PLUG-IN COMMUNICATION MODULE

CROSS REFERENCE TO RELATED APPLICATIONS

This application claims priority to the European application No. 04004217.8, filed Feb. 25, 2004 and which is incorporated by reference herein in its entirety.

FIELD OF INVENTION

The invention relates to a plug-in communication module and a method for communicating using a plug-in communication module.

BACKGROUND OF INVENTION

U.S. 2002/0156926 A1 discloses an independent Web server, which can be linked to an industrial automation system for direct access to inputs and outputs. For the purposes of coordination with a Programmable Logic Controller or PLC, block tags are used, which prevent both conflict between a number of Web connections and also between Web connections and control commands produced by the Programmable Logic Controller.

SUMMARY OF INVENTION

The object of the invention is to simplify the communication interface between assemblies and devices, in particular via the Internet.

This object is achieved by a plug-in communication module with means for storing and executing software components with communication functionality, with first connection means for direct electrical and mechanical coupling to interfaces of at least a first assembly, with access means for access to local communication means of the first assembly and with second connection means for electrical coupling to interfaces of at least a second assembly.

This object is achieved by a method for communicating using a plug-in communication module, with which method software components with communication functionality are stored and executed in the communication module, first connection means of the communication module are coupled directly electrically and mechanically to interfaces of at least a first assembly, the communication module accesses local communication means of the first assembly and is coupled electrically by means of second connection means to interfaces of at last a second assembly.

The invention is based on the concept of implementing the application-independent or optional communication functionality for assemblies in an independent plug-in communication module, instead of on the assembly itself, on a backplane bus assembly or in a remote Personal Computer (PC). According to the invention, the communication module is not permanently connected to an assembly. The term assembly also refers to a device, etc.

In particular if at least one of the software components is provided to execute communication tasks using Internet technologies, according to an advantageous embodiment of the invention a universal, favorable communication module can be provided. Communication means for executing communication tasks using Internet technologies therefore do not have to be provided in the assembly but access to the assemblies via Internet technology is still possible as an option. The communication module requires no administration and only one communication module is required for a plurality of assemblies, e.g. for all Programmable Logic Controllers (PLC) in a plant, for all devices in a house and this module can be plugged in as required to the respective assembly. All software and Web communication functionality can be stored on the communication module, only incurring cost there, not in the respective assembly. Web functions can be added at any time by plugging in a communication module of an assembly. Also quite simple and economical assemblies can thus optionally be read and configured using Internet technologies. One of the software components is advantageously a Web server or provided to execute Web services.

According to a further advantageous embodiment of the invention the access means for accessing a data and address bus of the assemblies are provided, i.e. the communication module is electrically so close to the respective assembly, that access interfaces within the assembly or more economical access interfaces can be used, in particular not software interfaces with remote capability.

The universality of the proposed communication module can be achieved according to a further embodiment of the invention in that the access means for accessing the communication means of the assemblies are provided by means of a generically extendable, locally usable point-to-point access protocol. Such a standardized access protocol, which is simple and economical to produce and has no remote capability, can be used for any assemblies. Thus the universality of the communication module means that there is the potential to achieve large production runs, despite the optional nature of their use, thereby reducing the unit cost of such a plug-in module.

The integration of reloadable application software is enabled, if according to a further advantageous embodiment of the invention the means for storing and executing software components are provided to load software components.

According to further advantageous embodiments of the invention, the first connection means are provided for direct electrical coupling with interfaces of assemblies of industrial automation systems and the second connection means are provided for electrical coupling to interfaces of man/machine interface components for engineering, parameterization and/or monitoring assemblies of industrial automation systems. The functionality of the engineering, diagnosis and maintenance software generally provided on the respective assembly can have a significantly higher capacity when stored and executed on the communication module. The latest, highest capacity and also memory-intensive software technologies can thus be used, because they are not subject to cost restrictions due to the assemblies. The interfacing of Web browsers (e.g. HTTP clients) with assemblies for engineering, parameterization and monitoring that previously had no Internet capability is enabled, particularly in the field of automation.

A further cost benefit can be achieved by configuring the communication module mechanically as a plug-in unit or integrating it permanently in a cable. Also such a communication module is significantly easier to operate, as neither intervention in the respective assembly nor the use of a PC is required for communication with an assembly.

BRIEF DESCRIPTION OF THE DRAWING

The invention is described and explained in more detail below with reference to the exemplary embodiments shown in the Figures, in which:

FIG. 2 shows an exemplary embodiment of the invention for use in household technology and FIG. 3 shows an exemplary embodiment of the invention for use in industrial automation technology.

DETAILED DESCRIPTION OF INVENTION

Figure 1:
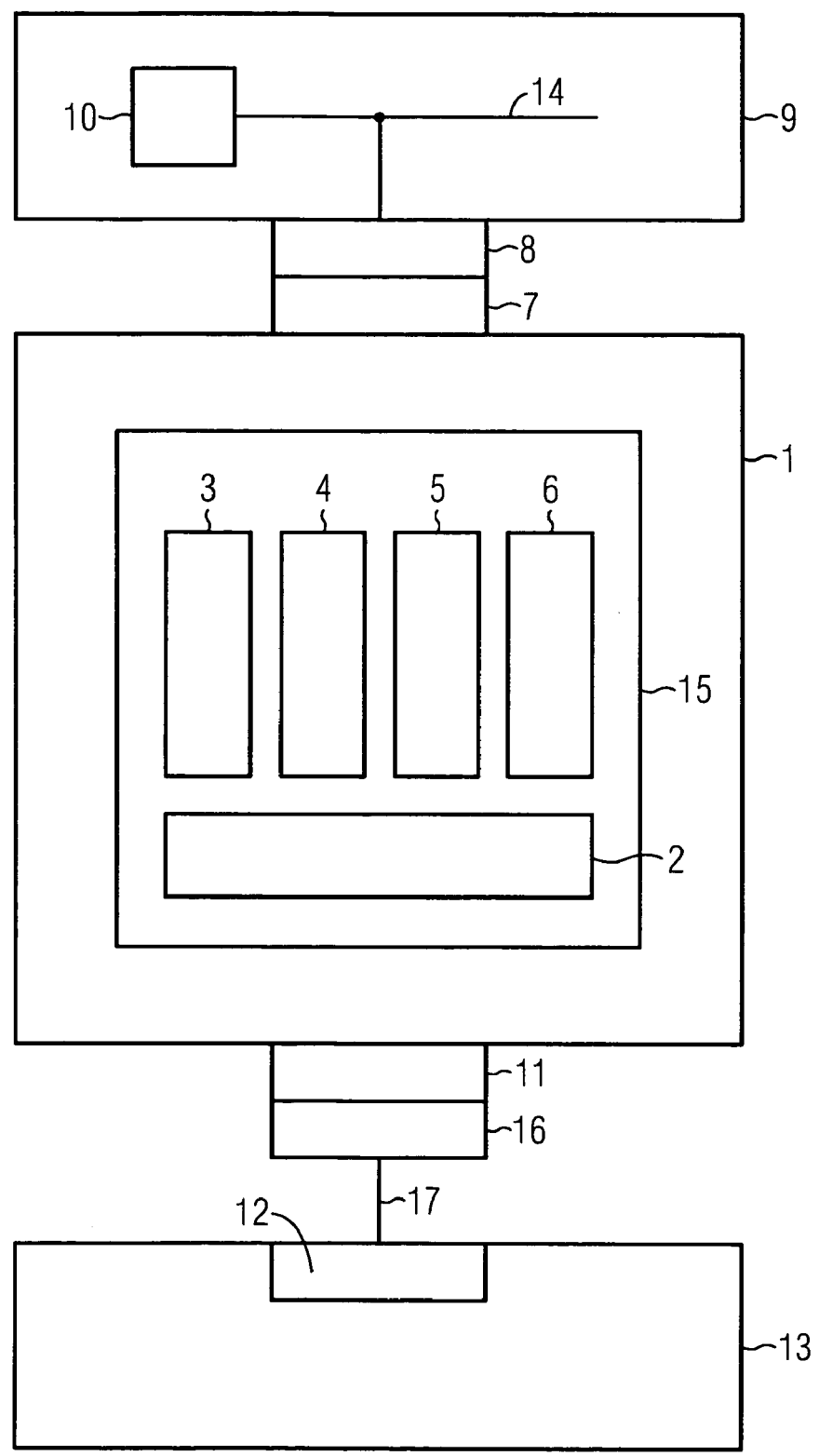
FIG. 1 shows a system comprising a plug-in communication module, an assembly and a man/machine interface component.

FIG. 1 shows a plug-in communication module 1 with means 2 for storing and executing software components 3, 4, 5 with communication functionality. The communication module 1 has first connection means 7 for direct electrical coupling to an interface 8 of an assembly 9. The assembly 9 contains communication means 10, which the communication module 1 can access using access means 6. The communication module 1 has second connection means 11 for electrical coupling to an interface 12 of a second assembly 13 in the form of a man/machine interface component. The means 2 for storing and executing the software components 3, 4, 5 according to the exemplary embodiment in FIG. 1 are an operating system and storage means of a microprocessor 15, which is contained in the plug-in communication module 1. The coupling between the second connection means 11 of the communication module 1 and the interface 12 of the second assembly 13 is effected using further connection means 16 and a line 17. According to one embodiment of the invention (not shown here), the second connection means 11 could also be connected directly to an interface 12 of a second assembly 13. The access means 6 of the communication module 1 in particular allow access to a data and address bus 14 of the assembly 9. The communication module 1 is designed as a plug-in module or plug-in unit. The first connection means 7 are thereby configured particularly as plug contacts, so that a connection can easily be established with an interface 8 with corresponding socket contacts. The second connection means 11 are configured as socket contacts so that a connecting line 17 with connection means 16 in the form of a plug-in unit for example can be connected.

FIG. 2 shows an exemplary embodiment of the invention for use in household technology. A heater 20 is shown with electronic means 21 for determining consumption. The electronic means 21 have electrical contact means 25. The consumption of the heater 20 is determined continuously, but generally only read once a year. To link a reading device 24 with display means 28, on which a Web browser for example is installed, the consumption values determined need to be supplied, e.g. in the form of a Web page, e.g. by a Web server. For cost reasons it is not expedient to integrate such a Web server in the electronic means 21, as this functionality is only required rarely, specifically once a year during reading. The Web server functionality is thus advantageously stored in an external communication module 22, which can be linked as required via connection means 26 to the electrical contact means 25 of the electronic means 21. The communication module 22 is connected to the reading device 24 via the interface 27 by means of a line 23. A Web server is integrated in the plug-in communication module 22, which provides the consumption values in the form of a Web page and supplies them to the Web browser of the reading device 24. The direct plug connection between the electronic means 21 and the communication module 22 allows the connection between the two components to be broken again after the consumption values have been read so that reading can be continued at further heaters for example.

FIG. 3 shows an exemplary embodiment of the invention for use in industrial automation technology. It shows the components 31-35 of an industrial automation system 30. The components 31, 32 and 35 have interfaces 36, 37 and 38. A communication module 40 can be connected reversibly to these interfaces 36, 37 and 38 by means of connection means 39. The communication module 40 has further connection means 41, which are connected via a connecting line 42 to a client 43, e.g. an operating and/or monitoring device. The client 43 has display means 44 and operating means 45 and is an exemplary embodiment of a man/machine interface component.

To date, access to components, e.g. Programmable Logic Controllers, peripheral assemblies, refrigerators, photographic equipment, etc. for configuration, upgrade, maintenance, download, etc. was frequently effected via Web servers or Web services. The Web servers or Web services (in some instances also other services) can thereby operate on the assemblies themselves and provide the TCP/IP and HTTP protocols and generally other protocols too there (e.g. SOAP, OPC XML, configuration protocols, etc.). A user can use a Web browser to access Web pages and use Web services, e.g. configuration programs, maintenance programs, programs for operating and monitoring, repair, inventory, etc.

Client programs, programmed for example in JAVA, J script etc., can access assembly data. Web servers and Web services on the respective assembly allow utilization of the benefits of Internet technology, e.g. economical standard software and hardware at the client, world-wide accessibility, etc. Many of the above assemblies are however small compared to the PC and are required in large quantities. Therefore such assemblies are often cost-sensitive. Internet technology was however conceived for PC and is designed with the corresponding hardware resources. Web servers and Web services therefore often impose an excessive cost on the assemblies, e.g. for RAM and CPU. This cost is also incurred when access is only required occasionally and locally, e.g. within the plant or for occasional reconfiguration of the assemblies, e.g. when switching to a different type of production. The more extensive the data and the functionality of the Web pages and Web services, the higher the cost resulting for the assembly. To date the Internet functionalities of assemblies were therefore often limited in that for cost reasons only few or even no Web servers, Web services and Web pages could be used on the assemblies. Another standard solution is to connect the assemblies via protocols without Internet capability to a PC, the PC providing the entire Web functionality. The disadvantage of this variant, commonly used to date, is that a PC is required, which in many instances, in particular in less developed areas, is too expensive or cannot be used in an expedient manner due to the level of training and complexity of operation or size.

The solution proposed here in particular comprises a hardware-Web communication module (Web plug) e.g. in the form of an Ethernet plug/cable, SIM-compatible module of a memory card or USB connector. Web services and/or other only occasionally required services are executed with this communication module. The code for a Web server or for Web services or other services can be stored in the communication module and/or Web pages and/or other data used for communication outside the assembly can be stored. A Web server is a typical component for executing communication tasks using Internet technology. The communication module can be configured as a miniature CPU module, e.g. as part of a connecting cable or part of a multimedia card.

According to a further exemplary embodiment, an assembly for controlling a machine is to be produced as economically as possible, the assembly however still being such that it can be configured, diagnosed and maintained with Internet technology and a standard PC. However no Web connection is required for daily operation of the assembly. Also assembly-specific software installation is to be avoided on the standard PC. Provision of the assembly-specific software on the assembly itself would however incur undesirably high costs. An economical solution is offered here by a Web communication module, which provides both the assembly-specific configuration software and the necessary software components for executing communication tasks using Internet technologies. This Web communication module is only connected as required to the assembly to control the machine and can therefore be used for the sequential configuration of different assemblies.

A further exemplary embodiment of the invention is a plug-in USB communication module (USB master and/or slave). USB stands for Universal Serial Bus and refers to an industry standard, which defines communication methods and communication means, in particular for connecting peripheral components to computers. Such a USB communication module can for example be used to connect field devices, PLCs, PCs, PDAs. The form proposed is a cable or remote interface module, the USB communication module not being permanently connected to the PLC, the backplane or the I/O modules but being provided remotely via existing interfaces other than the USB. Specific characteristics of such a USB communication module are provided remotely by DP, PPI, MPI, OPC, HTTP, SOAP, Bluetooth, etc.

Such a USB communication module—e.g. in the form of an Ethernet plug, a SIM-compatible module, an SD or MMC card—can be used for engineering, configuration, HMI, diagnosis and/or tracing. Web servers and Web services and/or other only occasionally required services can optionally also be executed on the USB communication module and/or the code for USB, the servers and services can be stored and/or Web pages and/or other data used for communication outside the assembly can be stored. The USB communication module can be plugged in to the assembly, the PLC, the I/O module, the field device and not connected permanently to these, the USB communication module being so close to the assembly electrically that access interfaces within the assembly can be used, e.g. the data and address bus within the assembly or software interfaces without remote capability. No backplane bus, I/O bus or other interfaces with remote capability otherwise present as standard on the PLC have to be used to achieve USB connectivity.

To summarize the invention therefore relates to a plug-in communication module 1 and a method for communicating using a plug-in communication module 1 to simplify the communication interfacing of assemblies and devices. A communication module 1 with means 2 for storing and executing software components 3, 4, 5 with communication functionality is therefore proposed with first connection means 7 for direct electrical and mechanical coupling to interfaces 8 of at last a first assembly 9, with access means 6 for accessing local communication means 10 of the first assembly 9 and with second connection means 11 for electrical coupling to interfaces 12 of at least a second assembly 13. Advantageous embodiments relate in particular to a communication module, in which at least one of the software components 3, 4, 5 is provided to execute communication tasks using Internet technologies and/or at least one of the software components 3, 4, 5 is a Web server or is provided to execute Web services. In particular a plug-in (cable) coupling is proposed, which converts one or more of the following technologies logically and physically to one or more of the other technologies respectively: RS232, RS485, SPI, Profibus, field bus, MPI, OPC in USB, Ethernet, HTTP, SOAP, SOAP over USB, OPC XML over USB.

The invention claimed is:

1. A pluggable communication module, comprising:
   mechanisms for storing and executing software components having communication functionality, wherein at least one of the software components comprises software adapted for one or more of a configuration, engineering, diagnosis, and maintenance of at least a first assembly of assemblies of an industrial automation system;
   first connection mechanisms for direct electrical and mechanical coupling to interfaces of the assemblies of the industrial automation system;
   access mechanisms for accessing local communication mechanisms of the first assembly; and
   second connection mechanisms for electrical coupling to interfaces of at least a second assembly.

2. The communication module according to claim 1, wherein at least one of the software components is adapted to execute communication tasks using Internet technologies.

3. The communication module according to claim 1, wherein at least one of the software components is a Web server or is adapted to execute Web services.

4. The communication module according to claim 1, wherein the access mechanisms are adapted to access a data and address bus of the first assembly.

5. The communication module according to claim 1, wherein the access mechanisms are adapted to access the communication mechanisms of the first assembly by a generically extendable, locally usable point-to-point access protocol.

6. The communication module according to claim 1, wherein the mechanisms for storing and executing software components are adapted for loading software components.

7. The communication module according to claim 1, wherein the second connection mechanisms are adapted for electrical coupling to interfaces of man/machine interface components for engineering, parameterization and/or monitoring of the assemblies of industrial automation systems.

8. The communication module according to claim 1, wherein the communication module is designed as a plug-in unit.

9. The communication module according to claim 1, wherein the communication module is integrated in a cable.

10. The communication module according to claim 1, wherein the second assembly is configured as a man/machine interface component.

11. A method for communicating using a pluggable communication module, the method comprising:
    storing and executing software components having communication functionality in the communication module, wherein at least one of the software components comprises software adapted for one or more of a configuration, engineering, diagnosis, and maintenance of at least a first assembly of assemblies of an industrial automation system;
    directly electrically and mechanically coupling first connection mechanisms of the communication module to interfaces of assemblies of an industrial automation system;
    accessing local communication mechanisms of the first assembly by the communication module, wherein the communication module is coupled electrically by second connection mechanisms to interfaces of at least a second assembly.

12. The method according to claim 11, wherein at least one of the software components executes communication tasks using Internet technologies.

13. The method according to claim 11, wherein at least one of the software components is a Web server or executes Web services.

14. The method according to claim 11, wherein the communication module accesses a data and address bus of the first assembly.

15. The method according to claim 11, wherein the communication module accesses the communication mechanisms of the first assembly by a generically extendable, locally usable point-to-point access protocol.

16. The method according to claim 11, wherein the communication module is adapted to load software components.

17. The method according to claim 11, wherein the communication module is coupled electrically by the second connection mechanisms to interfaces of man/machine interface components for engineering, parameterization and/or monitoring of assemblies of industrial automation systems.

18. The method according to claim 11, wherein the communication module is configured as a plug-in unit.

19. The method according to claim 11, wherein the communication module is integrated permanently in a cable.

20. The method according to claim 11, wherein the second assembly is designed as a man/machine interface component.

21. The communication module according to claim 1, wherein the communication module includes all the software components necessary for each of the assemblies to communicate outside the assemblies.

22. The method according to claim 11, wherein the communication module includes all the software components necessary for each of the assemblies to communicate outside the assemblies.

* * * * *